Dec. 20, 1932.　　　　P. HAUK　　　　1,891,279
MARBLE AND GRANITE SHAPING MACHINE
Filed April 30, 1931　　2 Sheets-Sheet 1
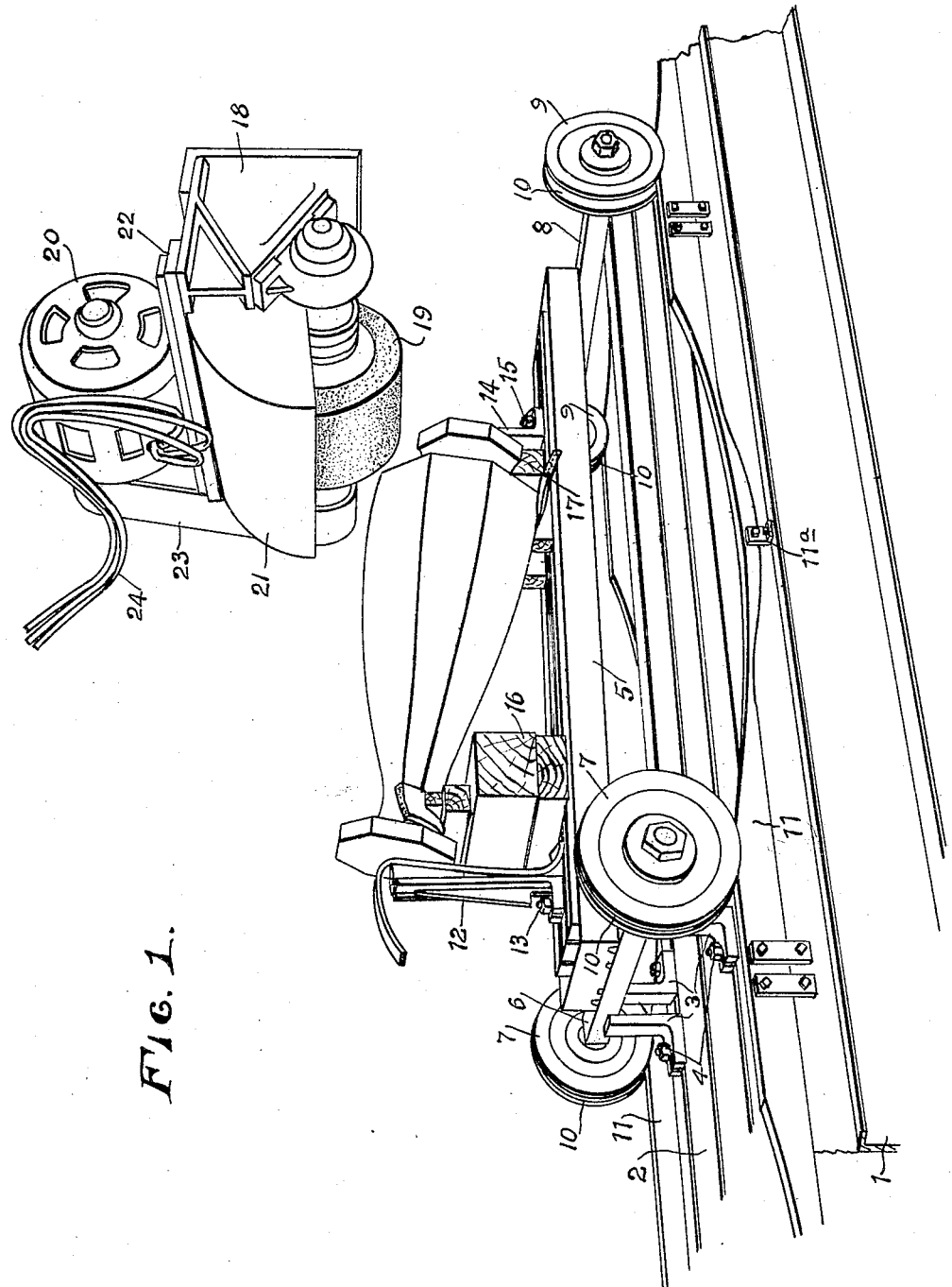

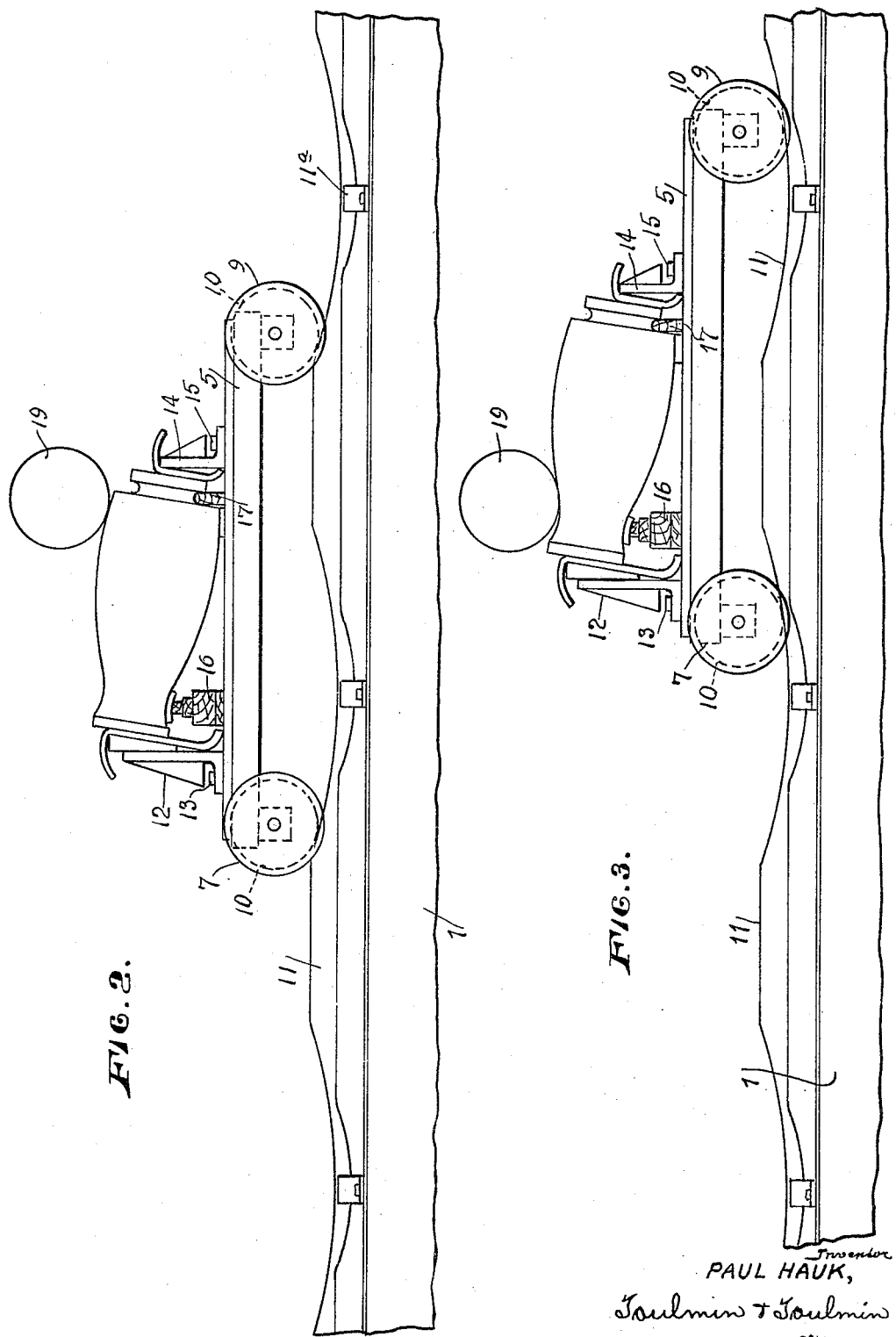

Patented Dec. 20, 1932

1,891,279

UNITED STATES PATENT OFFICE

PAUL HAUK, OF PIQUA, OHIO, ASSIGNOR TO THE PIQUA GRANITE AND MARBLE COMPANY, OF PIQUA, OHIO

MARBLE AND GRANITE SHAPING MACHINE

Application filed April 30, 1931. Serial No. 533,883.

This invention relates to improvements in stone working machines, and has for its object to provide a machine that will give to pieces of stone, such as marble or granite, the desired shape by causing the stone worked upon to move in a longitudinal, horizontal direction over an undulating track.

It is particularly the object of this invention to provide in connection with a stationary support for a cutter or grinder, means for causing a piece of marble, granite or other stone to travel over a horizontal and undulating track in such a manner that the tool will apply to the stone worked upon a definite and desired shape.

It is particularly the object of this invention to provide, in connection with a rotating grinder or cutter, means adapted to have a plurality of variously shaped rails applied thereto for supporting a truck thereon for supporting granite, marble or other stone to be worked upon, and convey the stone against the cutter or grinder.

These and other objects and advantages will appear from the following description taken in connection with the drawings.

Referring to the drawings:

Figure 1 is a perspective view showing the complete apparatus with the parts in position before operation begins.

Figure 2 is a side elevation of the apparatus showing the parts in position for beginning work.

Figure 3 is a side elevation of the apparatus after one course of operation has been completed.

Figure 1 shows a perspective of the complete apparatus with a piece of granite or marble worked upon. For supporting the whole moving structure there is provided a base 1, which is stationary and has thereon suitable tracks, not shown, for supporting a truck 2 for longitudinal movement. The trackway that supports the truck 2 is horizontal and does not undulate. Some means is provided for causing the truck located on this track to move in a horizontal direction to and from the tool in the form of a grinder.

Extending upwardly from this truck are two pairs of standards 3, one pair on each side. Between the standards of each pair there is a small space to accommodate the rear axles of wheels supporting a platform 5. These standards are held in adjusted position on the truck by means of screws 4. Between the standards of each pair the rear axle 6 of the platform rests and is guided for up and down movement.

On each end of the axle 6 is a rear wheel 7. At the front end of the platform 5 is a front axle 8, similar to axle 6. This axle has on each end a front wheel 9. These wheels have peripheral grooves 10 therein which engage tracks or ways 11, which are removably supported by and attached to the base 1. These tracks are undulating and may have undulations of various forms, depths and length.

As the platform, supported by the wheels 7 and 9, moves over the trackways the work supported by the platform will move up and down, according to the length, depth and general contour of the undulations of the rails. The track members may be held to the base in any suitable manner. In the present instance they are shown attached to the base by means of clips or strips 11a.

On the rear end of the platform is an upwardly extending rear head 12, adjustably attached to the platform by means of bolts 13. Near the front end of the platform is a front head 14, adjustably attached to the platform by means of bolts 15. The block or piece of granite or marble or other stone worked upon is held between these two head members. Adjacent the rear head 12 are supporting blocks 16, which support the rear end of the work. At the front end adjacent the front head is a block 17, which supports the front end of the work. Cooperating with the blocks are wedge members for properly adjusting the work and holding it in proper alignment and position with relation to the tool that shapes the stone. Any other suitable means could be used in connection with the heads for supporting the ends of the block of marble or granite worked upon.

Suitably supported over the trackway are brackets 18. These brackets support the ends of an axle on which a grinder 19 is positioned.

This grinder is located immediately above the platform and is adapted to rotate as the platform moves and carries with it the work. For the purpose of rotating the grinder there is located on top of the brackets a motor 20, which is supported on the brackets by means of a platform 22. On one end of the grinder shaft is a pulley, and on one end of the motor shaft is a pulley. These two pulleys are connected by a belt 23, by which the grinder is operated from the motor. For the purpose of protecting the operator from dust and grit flying from the grinder, a protector 21 is supported on the brackets over and to one side of the grinder. Current is supplied to the motor through wires 24.

The brackets 18 may be supported on posts or a wall immediately above the base and the trackway supported by the base. While these brackets are not shown as being adjustable they may be supported adjustably on the wall or post so that the grinder may be elevated or lowered to suit the size of the stone being worked upon. The contour of the upper edge of the piece of stone worked upon is the reverse of the undulating travel of the platform. As the platform as a whole descends the contour of the upper surface of the work rises, and as the platform in its line of travel ascends, the grinder will cut into the work so that the upper contour of the work will have a shape the reverse of that of the line of movement of the truck during its operation. By changing the undulation in the trackways different shapes may be given the stone worked upon. The variations in the manner of undulations are effected by changing the tracks upon which the platform travels.

I desire to comprehend within my invention such modifications as may be embraced within my claims and the scope of my invention.

Having thus fully described my invention, what I claim as new and desire to secure by Letters Patent, is:

1. In a stone-shaping apparatus, a horizontally movable truck, a stationary undulating trackway composed of rails, one on each side of the truck, a platform having supporting wheels on the trackway and adapted to be moved by the truck, a connection between the platform and truck permitting relative movement therebetween, said platform being adapted to support a stone being worked on, and a stationary roller grinder adapted to engage the stone as the platform moves along the trackway for grinding and shaping the stone.

2. In a stone-shaping apparatus, a horizontally movable truck having a pair of standards thereon, a stationary trackway composed of rails, one on each side of the truck, a platform having a front and a rear axle with wheels thereon engaging the rails, one of the axles being between the standards, whereby movement of the truck causes the platform to move and have an undulating movement along the trackway and relative movement to said truck, and a stationary rotary grinder supported above the truck for grinding a stone on the platform and giving the stone an undulating surface.

3. In a stone-supporting and moving apparatus, in combination with a stationary grinder, a horizontally movable truck, a trackway consisting of a pair of undulating replaceable rails, one on each side of the truck, and a stone-carrying means on the track operatively connected to the truck, a connection between the stone carrying means and truck permitting relative movement therebetween whereby when the truck moves the stone-carrying means moves by the grinder in an undulating path.

In testimony whereof, I affix my signature.

PAUL HAUK.